United States Patent [19]

Eckholm et al.

[11] Patent Number: 5,350,586
[45] Date of Patent: Sep. 27, 1994

[54] BONELESS HAM SUBSTITUTES MADE FROM WHOLE FISH FILLETS

[75] Inventors: Eric Eckholm, Juneau, Ak.; David Lustig, New Hope, Pa.

[73] Assignee: Health Sea, Inc., Juneau, Ak.

[21] Appl. No.: 26,342

[22] Filed: Mar. 1, 1993

[51] Int. Cl.$^5$ .............................................. A23L 1/325
[52] U.S. Cl. ..................................... 426/105; 426/643
[58] Field of Search ............... 426/105, 264, 265, 266, 426/643, 412

[56] References Cited

U.S. PATENT DOCUMENTS

| | | |
|---|---|---|
| 1,174,635 | 3/1916 | Stafford . |
| 2,487,957 | 11/1949 | Wexler . |
| 3,897,573 | 7/1975 | Kelly .................................. 426/272 |
| 4,301,182 | 11/1981 | Simon et al. ...................... 426/643 X |
| 4,305,965 | 12/1981 | Cheney ............................. 426/264 X |
| 4,621,482 | 11/1986 | Crevasse et al. ................ 426/105 X |
| 4,690,843 | 9/1987 | Inagaki ............................. 426/105 X |
| 4,871,565 | 10/1989 | Sugisawa et al. .................. 426/407 |
| 4,877,626 | 10/1989 | Ande et al. ...................... 426/643 X |
| 4,948,620 | 8/1990 | Clairouin et al. .................. 426/643 |
| 5,238,691 | 8/1993 | DeNike et al. ................... 426/643 X |

FOREIGN PATENT DOCUMENTS

| | | |
|---|---|---|
| 1111706 | 11/1981 | Canada .............................. 426/105 |
| 60-9781 | 1/1985 | Japan . |
| 60-009781 | 3/1985 | Japan . |
| 60-62961 | 4/1985 | Japan . |
| 60-153747 | 8/1985 | Japan . |
| 60-196171 | 10/1985 | Japan . |
| 60-196171 | 10/1985 | Japan . |
| 21-71163 | 7/1990 | Japan . |
| 2-171163 | 7/1990 | Japan . |
| 396106 | 12/1973 | U.S.S.R. . |
| 1163223 | 9/1969 | United Kingdom ................ 426/105 |

Primary Examiner—Arthur L. Corbin
Attorney, Agent, or Firm—Lowe, Price, LeBlanc & Becker

[57] ABSTRACT

A method of preparing a boneless ham substitute from whole fish comprises the steps of filleting a red or pink fleshed fish, preferably a chum or pink salmon, followed by removing the fat layer from the fillets and deboning, and before mixing the fillets in a mixer having blades or vacuum tumbling that breaks up the whole fish muscle, a mixture of ingredients are successively added and thoroughly mixed with the fish, including salt, a premix cure consisting of nitrite and salt, and brown sugar or an equivalent thereof. The thoroughly mixed batch is placed in a stuffing machine and preferably bagged into an edible collagen film, fibrous or plastic casing in predetermined amounts before being netted and subjected to natural smoking and cooking. The resulting products have the flavor, aroma, consistency and texture of ham.

24 Claims, 1 Drawing Sheet

BONELESS HAM SUBSTITUTES MADE FROM WHOLE FISH FILLETS

TECHNICAL FIELD

The present invention relates to manufacturing a substitute for boneless ham from fish and, more particularly, to making a boneless ham substitute resembling ham in texture, taste and look from a fish having naturally red or pink meat or some degree of red pigmentation.

BACKGROUND ART

As used in this specification, the term boneless "ham" or "ham product" refers to a pork product which has been cured by salting and smoking.

Ham and ham products are enjoyed by countless millions. Unfortunately, such pork products are relatively high in cholesterol and caloric content and therefore considered unhealthy for consumption by certain individuals having weight and/or heart disease related problems.

It is accordingly an object of the invention to provide a boneless ham substitute having the same or substantially the same texture, flavor, aroma and consistency of ham or ham products but made from fish.

Another object of this invention is to provide a boneless ham substitute made from a red or pink fleshed fish.

Another object is to utilize a fish which constitutes an economically raw material such that its incorporation into a boneless ham substitute would add economic value to the fish.

DISCLOSURE OF THE INVENTION

A method of producing a boneless ham substitute from whole fish comprises the steps of filleting and deboning the fish and then mixing the fillets in a mixer or tumbler to physically separate the whole fish muscles into generally uniform muscle structures. The physically separated muscles are then mixed with a ham curing mixture. The resulting mixture is apportioned into predetermined quantities which are wrapped into edible film or casings, smoked and cooked. The resulting product has the flavor, texture, aroma and consistency of boneless ham.

In accordance with this invention, the fish is preferably a pink or red pigment fleshed fish, such as one of the salmon varieties. In a preferred embodiment of this invention, chum or pink salmon is a highly preferred fish since the product resulting from the method of this invention is a value added product due to the limited market and utilization of chum or pink salmon in other forms.

In accordance with a highly preferred feature of this invention, the mixture of the ham cure and fish muscles is stuffed into a film (e.g., an edible collagen film) which is permeable to smoke. The stuffed film is netted to create the appearance of a genuine ham product and the skin formulation of the edible film advantageously allows the individually packaged products to then be naturally smoked and cooked to result in the boneless ham substitute of this invention.

A boneless ham substitute made from whole fish is also disclosed. The substitute has the flavor, texture, aroma and consistency of a boneless ham product and comprises a mixture of whole muscled fish fillets of pink or red fleshed fish and a ham curing mixture which together has been smoked and cooked and wrapped within an edible film or casing.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
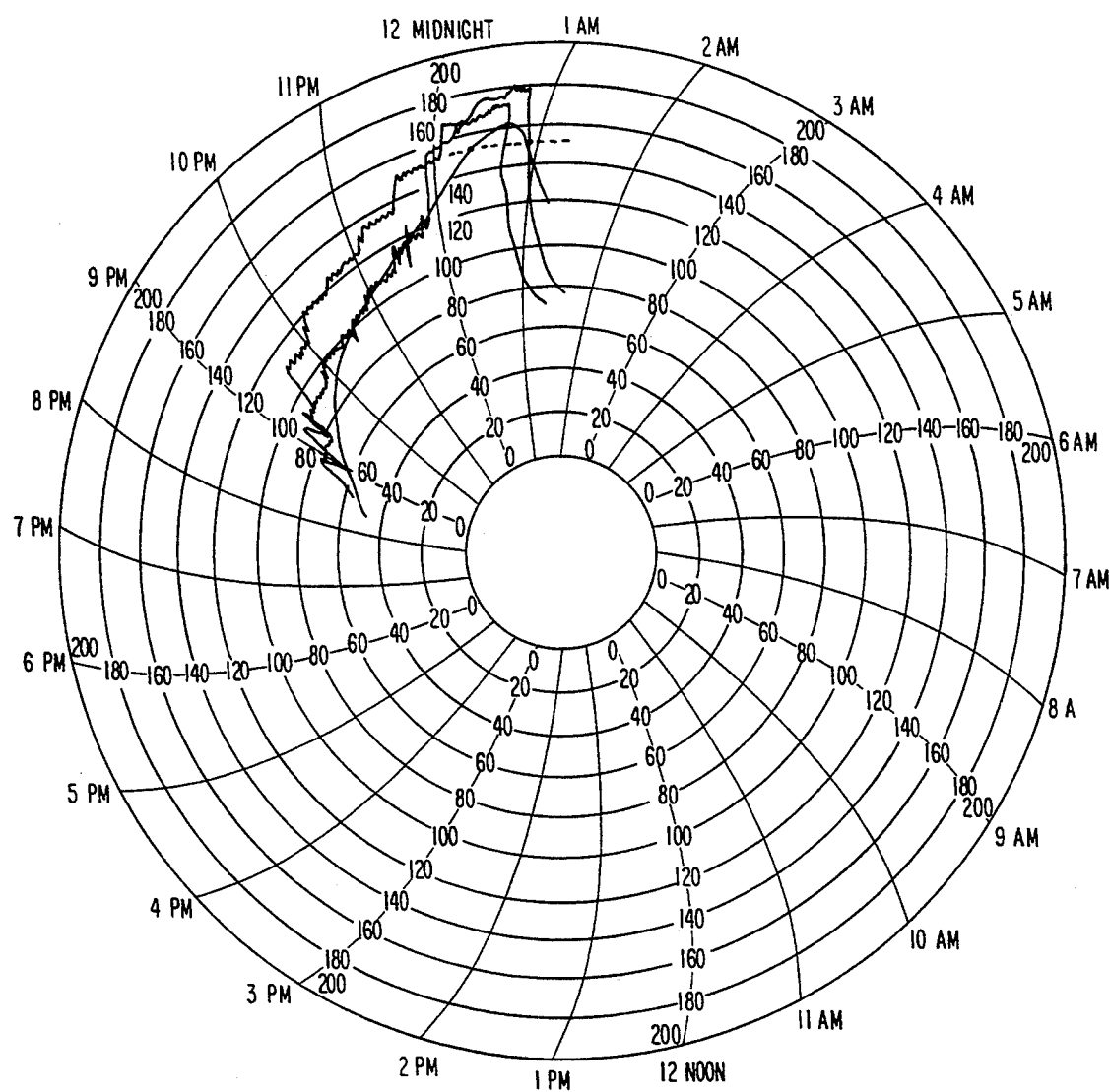
FIG. 1 is a smoking diagram which may be followed to cook and smoke the fish and ham curing mixture of this invention.

According to the preferred embodiment of the present invention, the fish intended for the preparation of boneless ham substitutes is in the form of fillets. In the context of this invention, fillets are understood to be not only whole fillets, but also pieces of fillets or strips or mince of raw fish of appropriate size. For example, about 10–20% of the fish may be minced (e.g., salmon) which is recovered during the filleting process.

To obtain a natural healthy product having the physical texture and taste of a ham made from pork products, it is a highly preferred feature of this invention to utilize a red fleshed fish having naturally occurring red or pink pigmentations such as one of the varieties of salmon which are sold commercially. In particular, it is a preferred feature of the present invention to utilize chum or pink salmon which, compared to the other salmon varieties (e.g., king, sockeye, Coho and Atlantic) are of less commercial value and therefore constitutes an economically raw material to which value can be added by processing in accordance with the invention herein. Unlike other salmon varieties, chum and pink salmon are the less usable salmon. (It is presently known to can the pink and chum salmon, however, canning is expensive and represents a declining market in the United States.) Another known use for chum salmon involves the drying and dehydrating of frozen fish product to make fish flakes. In accordance with the unique process appearing below, the chum and pink salmon (or other salmon variety) or a pale meat fish (with no red pigmentation) is processed into a ham shape within an edible protein film and netting and with taste, aroma and texture very similar or almost identical to that of boneless ham made from pork products.

As mentioned above, chum and pink salmon are highly preferred for the manufacture of a boneless ham substitute in accordance with the present invention. However, any fish having red meat or a high percentage of pink meat (e.g., 60–75% or more of pink meat) may be acceptable. Completely pale meat may also be used if in combination with a dye system (e.g., oleo resin, paprika, etc.), but finished color is less desirable in appearance.

The first step of the process of this invention is to fillet a whole fish (e.g., 2–12 pounds) and to remove the skin. In accordance with this invention, it is highly preferred to remove (e.g., with a trimming knife) the fat layer which appears as a lateral layer of gray meat on the side of the fillet to avoid discoloration in the final product and thereby provide a final product of uniform pinkish color.

Once the fat layer is removed, all the pin bones are removed from the lateral portion of the fillet so that the fillet is now totally boneless, skinless, with the fat layer removed.

The fillets are then placed in a mixer or tumbler having ribboned paddles or compartments to impart mechanical action to the fillets as they rotate 360°. Due to the fragile nature of the muscle structure, this mechanical action fragments the muscles or physically separates the muscles by breaking the fragile interconnecting interstitial tissue between the principle muscle parts, into blended smaller muscle structures. The mixing preferably occurs for approximately one to four minutes to enable the mechanical action to pull apart and separate the muscle segments. This agitation caused by mixing or tumbling is highly preferred to ensure subsequent adequate penetration of additives, particularly curing additives which in combination with the nature of the salmon meat and later smoking and cooking thereof will result in the ham-like flavors, aroma and desired texture and consistency.

During mixing the temperature is preferably maintained within a range of approximately 28°–32° F. This allows for the use of longer mixing intervals without smearing and also improves thorough mixing of the additives as described hereinafter. Optionally, the fillets may be mixed or tumbled under vacuum which aids to structurally open up the muscle tissues. However, at least in the case of chum and pink salmon, the muscle tissues are so fragile that non-vacuum or tumbling mixing readily and advantageously occurs. Table 1 below depicts the ingredients which are mixed, by way of example, with 150 pounds of salmon fillets to obtain the unique composition of this invention:

TABLE 1

SALMON HAM
FORMULA - PERCENT INGREDIENTS

| Ingredient | lbs. | Oz. | % |
|---|---|---|---|
| Salmon | 150.0 | 2400.0 | 81.92 |
| Water | 15.0 | 240.0 | 8.19 |
| Modified Food Starch | 7.5 | 120.0 | 4.09 |
| Salt NaCl | 3.0 | 48.0 | 1.63 |
| Brown Sugar | 3.0 | 48.0 | 1.63 |
| Dextrose | 3.0 | 48.0 | 1.63 |
| Sodium Phosphates | 0.75 | 12.0 | 0.409 |
| Premix Cure (8% nitrite) | 0.75 | 12.0 | 0.409 |
| Sodium Erythorbate | 0.09 | 1.44 | 0.049 |
| Total | 183.09 | 2929.44 | 99.957 |

More specifically, salt (NaCl) and premix cure are initially added to the mix. Approximately 1.63 wt. % of salt is combined with 0.049% of premix cure. The premix cure is 8% nitrite ($NO_2$) and 92% salt (NaCl). The salt (NaCl) and premix cure assist in the extraction of the salt soluble proteins (actin and myosin) from the fish muscles. This extraction enables or facilitates subsequent binding of the muscles with the other ingredients.

Prior to adding the salt and premix cure, some water is added to the mix of salmon. Approximately 1/3 or 5 lbs. of the water ingredient is initially added to the mixed fish muscles prior to the salt and premix cure addition. The balance of the water (10 lbs.) is added to the starch to put it into suspension as a batter. This starch batter is then added to the total mix.

After the salt and the premix cure are added, combination sodium phosphates are added, composed of:

(1) sodium tripoly $Po_4$,
(2) sodium poly $Po_4$ glassy,
(3) sodium pyrophosphate, and
(4) sodium acid pyro $Po_4$.

The sodium phosphates are for pH control (microbiological protection) and also act as emulsifiers within the mix. The sodium phosphates further serve to sequester some of the metal ions from the fish protein that might otherwise later under vacuum packaging accelerate and spoil the color and flavor of the product, resulting in a shortened shelf life. The combination sodium phosphates help bind free moisture within the finished product.

Other types of sodium phosphates may be used, such as tripoly phosphate as known in the red meat ham processing industry. Other combination sodium phosphate systems may also be utilized. However, as a result of experimentation, the foregoing combination of sodium phosphates of Table 1 appears to work best with salmon and other red fish.

Approximately 0.049 wt. % of sodium erythorbate (sodium isoascorbate) is now added to the mix to act as a reducing agent or antioxidant preservative. When the finished product is exposed to air, the sodium erythorbate ingredient inhibits the pinkish or reddish product color from oxidizing to a brownish off color.

The brown sugar and dextrose sweetener ingredients are then mixed into the composition in the percentages or approximations thereof set forth in Table 1. Natural honey as a sweetener at a level of 3–5% (U.S. Grade C or above) with 80% solids can also be used to produce honey cured salmon ham. Next, a modified food starch is mixed into the composition with the balance of the water (10 lbs.) (the water and the starch are first mixed in a blender to create a batter or a slurry), in the amounts or approximations thereof set forth in Table 1. This starch ingredient is from a waxy maize corn base source and is pregelatinized. It is considered a refined manufactured specialty starch and not an ordinary starch.

The batch now contains all necessary ingredients and it is thoroughly mixed (again with a continuing target temperature of preferably approximately 36°–45° F.) for approximately 4 to 5 minutes or as is necessary to continuously mix and thoroughly blend the ingredients together within the batch. Once completely mixed, the batch is now ready for the stuffing process.

Once the batch has been thoroughly mixed and prepared as aforesaid, it is transferred to a vacuum stuffing machine, such as a VEMAG (German manufactured) stuffing machine which is a common stuffer used in the meat industry. The batch is preferably at least partially vacuumized in the machine and then can be portion filled by presetting the stuffing machine to stuff desired portions in casing materials. In accordance with the present invention, and in the preferred embodiment, the batch is apportioned into 12 to 48 ounce portions that are simultaneously portioned and formed into a sheet of edible collagen film and then netted automatically and metal clipped so that the individual portions are all encased in the film and net to simulate the appearance of a real netted boneless ham product. Of course, the stuffing can be encased in a plastic casing or in a fibrous casing or a carrageenan film or other material, each of which will result in a cylindrical finished product of different characteristics, but still a ham substitute.

A unique feature of the present invention, wherein an edible collagen film is used in combination with the aforementioned batch, is that the film is extremely smoke absorbent and smoke permeable so that the film encased and netted product may then be transferred to a smokehouse with the result that the smoke aroma, flavor and color is absorbed through the collagen film directly into the fish muscle.

More specifically, the collagen filmed and netted ham-like processed salmon portions are then loaded onto a smoke cart, preferably horizontally by laying them on screens which are then transferred into a smokehouse such as a Maurer AS (German manufac- The finished product of the preferred embodiment generally has a water/salt phase of about 3% and a pH of about 6.5–6.8. Moisture in the product is approximately 69–70% and the parts per million (ppm) of nitrite in the finished product is 90–110. The water activity is approximately 0.96 to 0.97 which is considered relatively high and, therefore, the preferred embodiment of the product of this invention requires vacuum packaging and refrigeration (33°–38° F.) which provides a shelf stability of 100–120 days.

Of course, it is within the scope of the invention to prepare the product in a plastic casing or a fibrous casing and to vary the batch composition in a manner which will now occur to one of ordinary skill in the art so as to prepare a product which is preferably frozen or sold as a delicatessen product subject to slicing into cold cuts.

| | | | | SALMON HAMS SMOKE PROGRAM | | | | | |
|---|---|---|---|---|---|---|---|---|---|
| STEP NO. | PROCESS | PROCESS CODE | STEP TIME (min.) | SERVICE TEMPERATURE | RELATIVE HUMIDITY | CORE TEMPERATURE | SMOKE DENSITY | TIME CONTROL | CORE TEMPERATURE CONTROL |
| 1 | slow dry | 3 | 20 | 100 | 35 | 48–50° F. | | | |
| 2 | slow smoke | 5 | 10 | 100 | 35 | 48–50° F. | 40 | | |
| 3 | slow dry | 3 | 10 | 110 | 40 | 48–50° F. | | | |
| 4 | slow smoke | 5 | 20 | 110 | 40 | 90 | 60 | | |
| 5 | slow dry | 3 | 5 | 115 | 40 | 90 | | | |
| 6 | slow smoke | 5 | 25 | 115 | 40 | 90 | 60 | | |
| 7 | slow dry | 3 | 5 | 125 | 40 | 90 | | | |
| 8 | slow smoke | 5 | 25 | 125 | 40 | 96 | 60 | | |
| 9 | slow dry | 3 | 5 | 135 | 40 | 96 | | | |
| 10 | slow smoke | 5 | 25 | 135 | 40 | 96 | 60 | | |
| 11 | slow dry | 3 | 5 | 145 | 45 | 96 | | | |
| 12 | slow smoke | 5 | 25 | 145 | 45 | 125 | 60 | | |
| 13 | slow dry | 3 | 5 | 155 | 50 | 125 | | | |
| 14 | slow smoke | 5 | 25 | 155 | 50 | 142 | 60 | | |
| 15 | slow hot air finish | 2 | 15 | 165 | 80% | 142 | | | |
| 16 | slow hot air finish | 2 | 20 | 175 | 80% | 142 | | | |
| 17 | slow hot air finish | 2 | | 180 | 80% | 160° F. | | | X |
| 18 | slow hot air finish | 2 | 20 | 160 | 80% | | | | |
| 19 | slow dry | 3 | 1 00 | 50° F. | 70% | | | | | tured). A traditional smokehouse requiring much longer smoking times is generally unsatisfactory since the smoke processing program must be as short and efficient as possible to reach 160° F. for 30 minutes duration.

As a result of extensive experimentation, the total smoking program is divided into four separate stages and smoke applications for a total time of approximately 4 to 5 hours and preferably 4½ hours. The following smoking program is preferred:

FIG. 1 is an illustration of a preferred smoking program according to the present invention.

In the event that a plastic or fibrous casing is used in which the batch is to be stuffed, then natural wood burning smoke flavoring cannot be added in the manner described above. If a plastic or fibrous casing is to be used, then a liquid smoke or other smoke flavoring must be added into the batch of fish. However, the desired ham-like taste and consistency will be inferior to the ham-like taste and consistency achieved with a natural wood burning smoking process.

With reference to the smoke program, the final step is to cook the core of the product to (160° F. for 30 minutes) following which the product is allowed to cool naturally. In connection with FIG. 1, it is to be noted that smoking and cooking occurs in a manner designed to achieve elimination of parasites commonly found on fish or in fish muscles.

The following example is offered as to a preferred procedure for preparing the batch. The example is based on a 150 pound batch and the total continuous mixing time is approximately 12 minutes in a butcher boy mixer:

EXAMPLE 1

SALMON HAM 150 LB. BATCH

PREPARATION PROCEDURE: TOTAL MIX TIME—12 MINUTES

STEPS

I. Clean and sanitizer rinse (Butcher Boy Mixer) using 50 ppm chloride or approved food grade sanitizer.
  A. Rinse thoroughly with water (32°–45° F.)

II. Place 150 lbs. chum fillets into Butcher Boy Mixer with 5 lbs water
  A. Inspect fillets for bones, blood, skin or other foreign substance.
  B. Remove defects
  C. Reject fillets if excessive defects are noticed.

III. Mix fillets for 1 minute PREBLEND
  A. Inspect again and remove defects
  B. Stop mixer-cut meat-fillets tangled on blades
  C. Mix again for 1 minute IV. Add 3.0 lbs. salt and 0.75 lbs. premix cure, dry as is
  A. Mix for 2 minutes V. Add 0.75 lbs. BK-85 phosphate, dry as is A. Mix for 2 minutes
VI. Add 0.09 lbs. Na Erythorbate (ascorbic acid)
  A. Mix for 1 minute
VII. Add 3.0 lbs. brown sugar and 3.0 lbs. dextrose, dry as is
  A. If lumpy—screen or break-up evenly
  B. Mix for 2 minutes
VIII. Mix 7.5 lbs. Firmtex with 10.0 lbs. water to a batter
  A. Add to mix
  B. Mix for 3 minutes
IX. Inspect salmon ham mix for consistency and thorough incorporation of all ingredients.
  A. Check temperature—Target 36°–45° F.
X. Remove salmon ham mix/batter
  A. Into holding bin or buckets
  B. Or directly to VEMAG stuffer The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A ham substitute having the flavor, texture, aroma and consistency of a ham product, comprising a shaped mixture of:
   whole muscled fish fillets, having pink or red pigmented flesh, which have been prepared by physically separating the muscles of the fish by breaking the interconnecting interstitial tissue between the principal muscle parts to form separated muscle structures; and
   a ham curing mixture compressing a nitrite, salt and water;
   wherein the ham curing mixture and whole muscled fish fillets have been smoked and cooked and wrapped within a casing or formed into a finished product.

2. The ham substitute of claim 1, wherein the final product has a generally uniform pinkish color derived solely from the naturally pink or red pigmented flesh.

3. The ham substitute of claim 1, wherein said fish is a salmon.

4. The ham substitute of claim 3, wherein said salmon is a chum or pink salmon.

5. The ham substitute of claim 4, wherein said salmon is a chum salmon.

6. The ham substitute of claim 1, wherein said ham substitute is wrapped within a casing.

7. The ham substitute of claim 6, wherein said casing is selected from the group consisting of a plastic casing, fibrous casing and a carrageenan casing.

8. The ham substitute of claim 6, wherein said casing is an edible collagen film which is smoke permeable.

9. The ham substitute of claim 8, further comprising a netting material wrapped around said edible collagen film to create the appearance of a ham product.

10. The ham substitute of claim 1, wherein said ham curing mixture further comprises honey, said ham substitute being a honey cured ham substitute.

11. The ham substitute of claim 10, wherein said ham curing mixture further comprises sodium phosphates and starch.

12. The ham substitute of claim 11, wherein said ham curing mixture consists essentially of:
   i. salt and a premixed cure including salt and nitrite;
   ii. water;
   iii. sodium phosphates;
   iv. an antioxidant preservative;
   v. brown sugar; dextrose; honey; and
   vi. a modified food starch.

13. A ham substitute having the flavor, texture, aroma and consistency of a ham product consisting essentially of:
   a mixture of whole muscled salmon fish fillets;
   minced fish in an amount less than about 20%; and
   a ham curing mixture, said ham curing mixture comprising at least nitrite, salt and water;
   wherein said mixture has been smoked and cooked and wrapped within a casing or formed into a finished product.

14. The ham substitute of claim 13, wherein said whole muscled fish fillets have been prepared by physically separating the muscles of the fish by breaking the interconnecting interstitial tissue between the principal muscle parts to separated muscle structures.

15. The ham substitute according to claim 13, wherein said ham substitute is wrapped within a casing and covered by a netting material.

16. The ham substitute of claim 15, wherein the ham curing mixture further comprises sodium phosphates and starch.

17. The ham substitute of claim 16, wherein said ham curing mixture consists essentially of:
   i. salt and a premixed cure including salt and nitrite;
   ii. water;
   iii. sodium phosphates;
   iv. an antioxidant preservative;
   v. brown sugar; dextrose; honey; and
   vi. a modified food starch.

18. The ham substitute of claim 13, wherein the final product has a generally uniform pinkish color derived solely from the naturally pink or red pigmented flesh.

19. A ham substitute having the flavor, texture, aroma and consistency of a ham product, consisting of:
   a mixture of whole muscled salmon fish fillets which have been prepared by physically separating the muscles of the fish by breaking the interconnecting interstitial tissue between the principal muscle parts;
   less than about 20% minced fish;
   a ham curing mixture consisting of NaCl, nitrite, sodium phosphates, sodium erythorbate, dextrose, brown sugar, starch, and water;
   wherein said mixture has been smoked and cooked and wrapped within a casing or formed into a finished product.

20. The ham substitute according to claim 19, wherein said ham substitute is wrapped within a casing and covered by a netting material.

21. A ham substitute having the flavor, texture, aroma and consistency of a ham product, comprising a mixture of whole muscled salmon fillets, minced salmon and a ham curing mixture which consists essentially of water, nitrite and salt and optionally sodium phosphates and a sugar, which together have been smoked and cooked and wrapped within a casing or formed into a finished product.

22. The ham substitute according to claim 21, wherein the product contains less than about 20% minced salmon.

23. The ham substitute according to claim 21, wherein the ham curing mixture consists essentially of:
   i. salt and a premixed cure including salt and nitrite;
   ii. water;
   iii. sodium phosphates;
   iv. an antioxidant preservative;
   v. brown sugar; dextrose; honey; and
   vi. a modified food starch.

24. A boneless ham substitute having the flavor, texture, aroma and consistency of a ham product, comprising a mixture of whole muscled fish fillets and a ham curing mixture comprised of individually predetermined quantities of:
   i. salt and a premixed cure including salt and nitrite;
   ii. water;
   iii. sodium phosphates;
   iv. an antioxidant preservative;
   v. broken sugar; dextrose; honey; and
   vi. a modified food starch;
   wherein the whole muscled fish fillets and ham curing mixture together have been smoked and cooked.

* * * * *